3,392,156
COPOLYMERS OF ETHYLENE AND VINYL TRIETHOXYSILANES AND MECHANICALLY WORKED PRODUCTS THEREOF
Charles R. Donaldson, Tuscola, Ill., assignor to National Distillers and Chemical Corporation, New York, N.Y., a corporation of Virginia
No Drawing. Filed July 10, 1964, Ser. No. 381,878
12 Claims. (Cl. 260—88.1)

ABSTRACT OF THE DISCLOSURE

Novel copolymers of ethylene and vinyl triethoxysilane having a reduced melt index and an increased stress crack resistance and methods for their preparation. The novel copolymers are prepared by copolymerizing ethylene and vinyl triethoxysilane and mechanically working the product to reduce the melt index and increase stress crack resistance.

---

This invention relates to novel copolymers of ethylene and to a process for manufacturing the same. More particularly, the invention pertains to novel copolymers of ethylene and vinyltriethoxysilane and to a process for preparing such copolymers.

In recent years it has been customary for manufacturers to tailor-make polymers and copolymers of ethylene as well as other alpha-olefins in order to obtain resin products with certain improved physical properties. Quite often it is the contemplated end use of the resin product which will determine which of the numerous physical properties require enhancement. Thus, for example, in numerous commercial applications where the ethylene polymers are to be molded and used for toys, carpet backings, sporting goods, and the like it would be desirable to have resins which have a lower melt index and greater stress crack resistance. Finished products molded from such resins would then be both tough and flexible in order to withstand the mechanical shocks and stresses which are ordinarily encountered. These properties would also be highly desirable when the ethylene resins are made into films which are subsequently converted into bags for foodstuffs, soft goods, pharmaceutical and surgical supplies, hardware, toys, and the like.

It is well known in the art to modify the properties of ethylene resins by copolymerizing the ethylene with a variety of comonomers. A number of the processes heretofore proposed for carrying out the copolymerization have the serious disadvantage of requiring special synthesis conditions or processing equipment. It has also been found that the use of certain comonomers results in copolymeric products which, although they may have certain improved physical properties, have other physical properties that have been deleteriously affected.

One object of the present invention is to provide novel copolymers of ethylene and vinyltriethoxysilane.

Another object of the present invention is to provide novel copolymers of ethylene and vinyltriethoxysilane characterized by having a lower melt index and higher stress crack resistance than conventional polyethylene resins.

A further object of the present invention is to provide a process for the preparation of copolymers from ethylene and vinyltriethoxysilane which avoids the disadvantages of the copolymerization processes of the prior art.

A still further object of the present invention is to provide a copolymerization process for the preparation of copolymers from ethylene and vinyltriethoxysilane which does not require either special synthesis conditions or equipment.

These and other objects of the present invention will become readily apparent from the ensuing description and illustrative embodiments.

In accordance with the present invention it has now been found that novel ethylene resin products having an unusual combination of properties can be prepared by polymerizing ethylene in admixture with a minor amount of vinyltriethoxysilane. The resulting ethylene-vinyltriethoxysilane copolymers will contain an amount of vinyltriethoxysilane ranging from about 0.25 to 12.5% by weight, and preferably about 1 to 4% by weight, based on the total weight of the copolymer.

Acetone extractions were used to estimate the extent of copolymerization of vinyltriethoxysilane with ethylene in the polymer. The studies indicate that vinyltriethoxysilane is soluble in acetone. Unreacted comonomer therefore, would tend to be removed from the polymer during a boiling acetone extraction. The extractions performed showed a polymer product weight loss of less than 0.2% by weight, which compares favorably with the 0.2% by weight losses usually encountered when conventional polyethylene resins are extracted with boiling acetone. Moreover, infrared analyses of the copolymers of this invention before and after acetone extraction showed no change in the vinyltriethoxysilane content. On the basis of these findings, it is concluded that all of the vinyltriethoxysilane in the copolymer is in the reacted form, and that the product is a true copolymer of ethylene and vinyltriethoxysilane.

As previously indicated and as will hereinafter be demonstrated, the copolymer of the present invention are characterized by lower melt index and greater stress crack resistance than polymers made from ethylene in the absence of the vinyltriethoxysilane under similar processing conditions. In accordance with one aspect of this invention it has been found that the degree of reduction in melt index will depend upon the amount of vinyltriethoxysilane in the copolymer. In general, it has been found that the higher the vinyltriethoxysilane content in the polymer the greater will be the reduction in melt index. For example, the melt index of an ethylene-vinyltriethoxysilane copolymer containing 0.41% by weight vinyltriethoxysilane was reduced approximately 21%. With a vinyltriethoxysilane content of 1.90% by weight or higher, on the other hand, the melt index of the copolymer was reduced 100%. Although, as set forth above, the amount of vinyltriethoxysilane in the copolymer can vary over a wide range, in many instances it is preferred to employ lower concentrations in order to avoid drastic reductions in such properties as yield strength, torsional stiffness, Vicat softening, and Elmendorf tear strength. Optical properties of blown film prepared from the copolymers of this invention become poorer when the vinyltriethoxysilane content is increased. Nevertheless, for certain commercial applications it may be desirable or essential to have a markedly reduced melt index even if other properties are drastically modified, and for such purposes higher concentrations of vinyltriethoxysilane are utilized.

One of the most important features of the present invention resides in the discovery that the reduction in melt index and the accompanying improvement in stress crack resistance occurs only during hot or mechanical working and more slowly during storage. Although all of the theoretical factors are not known at this time, the drop in melt index and the increase in stress crack resistance are considered evidence of the development of crosslinking in the copolymer. As will be demonstrated below, the desired improvements in the physical properties of the copolymer are not attained until the copolymeric resin has been worked or stored. Although a marked reduction in melt index can be accomplished by storage over a period of time ranging from about 5 to 12 weeks, particularly at the higher concentrations of vinyltriethoxysilane, i.e. above about 1.0% by weight, the preferred method is hot or mechanical working. The latter is accomplished, for example, by hot working on a conventional roll mill for a time period of about 0.1 to 3 hours at a temperature within the range of about 250° to 450° F. The preferred conditions for carrying out the hot, mill rolling are time periods within the range of about 0.1 to 2 hours and temperatures of about 250° to 350° F. Other possible methods for accomplishing the hot or mechanical working includes controlled extrusion as well as the use of Banbury and Kokneader equipment.

The vinyltriethoxysilane employed in the practice of this invention has the following chemical structure:

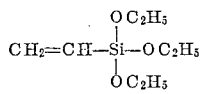

The vinyltriethoxysilane is a colorless liquid having a molecular weight of 190, a boiling point of 160.5° C., a specific gravity at 20° C. of 0.90, and a refractive index of 1.398. It is soluble in most organic solvents. Commercially available compounds may be utilized.

In general, the process of this invention comprises subjecting ethylene in admixture with a small amount of the vinyltriethoxysilane, ranging in amount from about 0.10 to 12.5% by weight, and preferably about 0.25 to 1.5% by weight, based on the weight of the ethylene, to selected polymerization conditions of elevated temperature and elevated pressure in the presence of a suitable catalyst and a suitable catalyst carrier, if desired. The rate of conversion of vinyltriethoxysilane to copolymer has been found to be directly proportional to the concentration of the vinyltriethoxysilane in the reaction mixture. It has also been found that greater incorporation of the vinyltriethoxysilane into the copolymer can be attained at higher reaction temperatures. The use of excess vinyltriethoxysilane in the reaction mixture is advisable, since only approximately 20% of the vinyltriethoxysilane fed to the reaction zone was converted into the copolymer. It will be understood, therefore, that the amount of comonomer employed may vary over a wide range depending upon the concentration of the vinyltriethoxysilane in the copolymer desired. As will also be understood to those skilled in the art, the reaction conditions may be varied within the broad ranges to achieve the desired copolymeric product.

The catalyst employed in the process of this invention can be any ethylene copolymerization catalyst suitable for use under the reaction conditions embodied herein. Particularly suitable are t-butyl perpivalate, t-butyl perbenzoate, dilauroyl peroxide, t-butyl peracetate, t-butyl peroxide, and other compounds of comparable free radical activity. As is well known to the art, the catalyst may be designated as a free radical polymerization catalyst. The amount of catalyst employed can vary over a wide range of from about 0.001 up to about 5% by weight, based on the ethylene feed.

The catalyst can be used alone or it can be used in conjunction with a catalyst carrier, which is generally an inert liquid solvent or diluent, such as, for example, benzene, hydrocarbon oils, such as, mineral oils, kerosenes, saturated hydrocarbons, mixtures thereof, and the like. The amount of catalyst carrier can range from about 0 to 100% by weight, based on the weight of the catalyst solution, and is preferably used in an amount of from about 80 to 99%.

The process of this invention may be carried out, if desired, with any of the many agents suitable as chain transfer agents in ethylene polymerization. Substances such as hydrogen, propane, cyclohexane, and isobutane are particularly suitable, but others such as the following may also be used: carbon tetrachloride; chloroform; hexachloroethane; saturated halogenated carboxylic acids and their esters; aldehydes; alkyl esters of inorganic oxyacids of sulfur, phosphorus, and silicon; mercaptans; and the like. Such agents possess the ability to control molecular weight of the copolymers in high pressure reactions.

As set forth above, the process in accordance with the present invention is carried out at conditions used in the high pressure polymerization of ethylene to prepare high molecular weight polymers. In general, the ethylene admixed with the vinyltriethoxysilane is compressed by multi-stage compressors up to the operating pressure in the polymerization reaction. The catalyst with or without a catalyst carrier and other additives, if desired, such as, for example, up to about 5.0% by weight, based on the catalyst carrier, of an antioxidant, are injected into the ethylene feed line.

In the polymerization reactor the ethylene and the vinyltriethoxysilane are polymerized to form a solid or semi-solid copolymer under pressures within the range of about 15,000 to about 45,000 pounds per square inch, and preferably about 20,000 to about 40,000 pounds per square inch, and at temperatures within the range of about 200° to 500° F., and preferably about 250° to 450° F. The product copolymer and the unreacted gases are then passed through pressure let-down valves into gas separators, which may be one or more in series. The unreacted gases are separated and recycled, if desired, to the ethylene feed line. The copolymeric product remaining in the final gas separator is extruded, cooled to room temperature, and subjected to conventional after-treatment steps, such as chopping, shredding, reprocessing, blending, Banburying, or the like.

In order to obtain the preferred copolymer product, it is important both that the pressure be in the range of about 20,000 to 40,000 p.s.i., and that the temperature be within the range of about 300° to 450° F. If the pressure is substantially below about 18,000 p.s.i. or substantially above about 40,000 p.s.i. and if the temperature is substantially below about 300° F. or substantially above about 480° F., the resulting copolymer does not have the desired combination of properties.

The relative ease with which this improved polymerization process can be carried out is an obvious advantage. As previously stated, there is no need to employ special equipment or reaction techniques in practicing the inventive method. Single-stage or multi-stage processes can be readily utilized, and the polymerization can be carried out as a bulk polymerization or in the presence of solvents, such as benzene, or of dispersants, such as water. The pressure attained can be achieved as usual by pressuring the reactor to the desired degree with ethylene. It will be understood that the usual polymer recovery processes are applicable to the method of this invention; for example, the unreacted ethylene and vinyltriethoxysilane can be separated from the molten copolymer in a vessel in which the temperature is essentially that of the reaction zone and the pressure is reduced to about one tenth of the pressure employed in the reaction zone. The pressure of the copolymer can be further reduced to about 0 to about 10 p.s.i. and the molten copolymer can then be extruded, cooled, and pelletized.

The copolymer of this invention may be molded or converted to a film by any convenient or conventional procedure. The film may be blown, flat, or cast. The films may be formed in thicknesses ranging in gauge from about 0.5 mil, suitable for use as garment bags, up to about 10 mils, suitable for use as tarpaulins.

The ethylene-vinyltriethoxysilane copolymers of this invention may also be used to improve the properties of waxes, such as petroleum-derived waxes, either microcrystalline or paraffin; synthetic waxes; and so forth. Such compositions are expected to have a unique combination of properties. The amount of the copolymer blended with the wax may vary over a wide range so that such compositions are useful, for example, as coatings for paper, cardboard, cloth, fiber, foil, plastics such as polyolefins, rug backings, and the like; moldings such as molded food containers, disposable containers, etc.; laminates for adhering various substances together such as aluminum to cellophane, aluminum to polyolefins such as polypropylene; etc.

It is also possible to use the copolymer of this invention in finely divided form, that is, where the copolymer has an average size of less than about 10 mesh and preferably within the range of about 150 to 2,000 microns. The finely divided, or powdered material may be used, for example, in dry form to coat articles by dip coating in either a static or fluidized bed, by powder coating wherein the powder is applied by spraying or dusting, and by flame spraying. In dispersed form, the powders may be applied as coating by roller coating, spray coating, slush coating, and dip coating to a variety of substrates. The powder may also be foamed or used in powder molding techniques; as a paper pulp additive; a mold release agent for rubber; an additive to waxes, paints, or polishes; a binder for non-woven fabrics; and the like. The finely divided material may be prepared by mechanical grinding, by solution or dispersion techniques, or by any other convenient or conventional technique.

The invention will be more fully understood by reference to the following illustrative embodiments. Unless otherwise specified, all parts are given by weight.

The density of the product is determined, in gram/cc., by a hydrostatic method, that is, by weighing a sample of the copolymer at 23° C., first in air and then in kerosene (ASTM test method D792–60T).

Melt index describes the flow behavior of a product at a specified temperature and under a specified pressure. It is here determined (ASTM test method D1238–57T) by measuring the flow rate, expressed in grams/10 minutes, on extrusion through an orifice 0.0825 inch in diameter by 0.315 inch long under a pressure of 43.1 p.s.i. at 190° C.

The yield strength is the tensile stress, in pounds per square inch of cross-sectional area of the test specimen, at which the slope of a stress-strain curve first becomes zero (ASTM test method D638–60T).

Torsional stiffness, measured in accordance with ASTM test method D1043–51, is the value obtained by measuring the angular deflection occurring when the specimen is subjected to an applied torque.

The heat softening point, referred as the Vicat softening temperature, is the temperature at which the test specimen becomes too soft to withstand stresses and keep its shape. It is the temperature at which a flat-ended needle of 1 square mm. cross section under a load of 1 kg. penetrates 1 mm. into a specimen. The temperature of the sample is increased at a uniform rate (ASTM test method 41525–58T).

Stress crack resistance is determined by ASTM test method D1693–60T as follows: bent specimens of the plastic having a controlled imperfection on one surface are exposed to the action of a surface active agent. The proportion of the total number of specimens which crack in a given time is observed.

Elongation is determined by the percent increase in the gauge length of a tensile specimen at the moment of rupture under tensile load (ASTM test method D638).

Tensile strength at break is determined by subjecting a tensile dumbbell specimen to tensile load at a constant rate of cross-bead speed. The maximum tensile stress sustained by the specimen at the moment of rupture is measured in pounds per square inch (ASTM test method D638).

Secant modulus is determined by subjecting a tensile dumbbell to a tensile load at constant rate of cross-bead speed. The ratio of stress to corresponding strain at 2% strain is measured in pounds per square inch (ASTM test method D638).

Low temperature brittleness is the temperature at which 50% of specimens subjected to specific conditions of impact fail (ASTM test method D746–57T).

Example I (A) A series of copolymerization runs were carried out utilizing a feed mixture of ethylene and vinyltriethoxysilane along with minor amounts of cyclohexane under the conditions set forth in Table I. The ethylene feed, received at a pressure of about 3,000 p.s.i.g., was passed through two surge tanks and then to the compressor wherein pressure was increased to 20,000 p.s.i.g. The modifier and the comonomer were pumped into the ethylene feed line between the surge tanks and the compressor. The pressurized ethylene feed was then fed to a split-feed, stirred reactor, while the catalyst solution was fed directly to the reaction zone through a top side entry in the reactor. The reactor was jacketed with flowing hot oil maintained at the same temperature as the reaction target temperature. The contact time was approximately 40 seconds. The copolymer product and unreacted gases passed from the reactor through a pressure let-down valve to the high pressure separator at a pressure of 1,500 to 2,000 p.s.i.g. Here the copolymer was separated from the unreacted gases and collected in the bottom of the vessel. The unreacted gases were discharged from the high pressure separator through a let-down valve and vent line to the atmosphere. The copolymer was maintained at the desired level in the separator and, when this level was exceeded, copolymer was passed from the bottom of the separator through a let-down valve into an extruder hopper. Copolymer was also maintained at the desired level in the extruder hopper and, when this level was exceeded, the copolymer was extruded through a two inch extruder. The extruder was equipped with a barrel extension so that the copolymeric product could be extruded on the side of the blast wall opposite the extruder. The die plate on the extruder barrel extension produced a ¼ inch diameter strand, which was cooled in a water bath as it passed to the pelletizer. Product pellets were collected in a bin at the pelletizer and bagged.

Run Nos. 1, 2, and 4 to 8 were carried out with a t-butyl perbenzoate as the catalyst; whereas Run Nos. 3 and 9 to 12 were carried out with t-butyl perpivalate as the catalyst.

The data show that the physical properties of the ethylene-vinyltriethoxysilane copolymer did not differ significantly from the physical properties of the ethylene polymer. Although a variety of physical properties could be obtained under different operating conditions, it is important to note that no improvement in stress crack resistance is indicated as a result of merely copolymerizing the vinyltriethoxysilane with the ethylene.

(B) A number of polymer samples produced as described above in paragraph (A) were hot worked on a roll mill for about 3 hours at a temperature of about 300° F. The results are set forth in Table II, wherein the polymer nos. correspond to the runs of Table I.

The data in Table II demonstrate that, following hot working on a roll mill, the melt index was considerably reduced and the stress crack resistance of the ethylene-vinyltriethoxysilane copolymer was far superior to ethylene polymers, i.e., polymer products which were produced in the absence of the vinyltriethoxysilane. More specifically, it should be noted that the ethylene-vinyltriethoxysilane copolymer had stress crack resistance of <0.25 hour for 50% failure before rolling milling. After the 3 hour roll mill working all of the copolymers of this invention which were tested had a stress crack resistance values of >48 hours, except for Polymer No. 12 which had a stress crack resistance value of 24 hours for 50% failure. In contrast, Polymer Nos. 1 and 2, which were straight ethylene polymer products, did not show any improvement in stress crack resistance after the hot working.

Although the use of roll milling procedure is described above in conjunction with effecting the desired changes in the melt index and the stress crack resistance values of the copolymer of this invention, it will be understood that other methods of accomplishing the hot or mechanical working are also contemplated. In general, the hot or mechanical working may be carried out for a time period sufficient to effect the desired changes in the physical properties.

ly, the novel combination of physical properties permits the copolymers of this invention to be employed for a variety of commercial applications.

While particular embodiments of this invention are shown above it will be understood that the invention is

TABLE I.—RUNS

| Run No | 1 | 2 | 3 | 4 | 5 | 6 | 7 | 8 | 9 | 10 | 11 | 12 |
|---|---|---|---|---|---|---|---|---|---|---|---|---|
| V.T.E.S., wt. percent [1] | 0.00 | 0.00 | 0.00 | 0.64 | 0.659 | 1.12 | 1.45 | 0.297 | 0.476 | 0.629 | 0.769 | 1.12 |
| Catalyst Conc. wt. percent [1] | 0.0044 | 0.0050 | 0.0265 | 0.0028 | 0.0028 | 0.0067 | 0.0078 | 0.0092 | 0.0169 | 0.0243 | 0.0304 | 0.0173 |
| Cyclohexane, wt. percent [1] | 3.74 | 4.06 | 4.51 | 3.55 | 2.74 | 3.10 | 1.96 | 2.84 | 3.71 | 3.84 | 3.79 | 4.89 |
| Feed Gas Temp. °F.[1] | 124 | 109 | 93 | 105 | 112 | 94 | 101 | 79 | 88 | 104 | 100 | 64 |
| Max. Reactor Temp. °F.[1] | 445 | 450 | 374 | 445 | 445 | 440 | 440 | 447 | 375 | 375 | 375 | 377 |
| Melt Index | 2.94 | 13.6 | 9.96 | 18.8 | 3.48 | 12.7 | 4.93 | 3.24 | 2.53 | 3.77 | 11.0 | 6.3 |
| Density | 0.9234 | 0.9236 | 0.9279 | 0.9235 | 0.9235 | 0.9239 | 0.9245 | 0.9215 | 0.9278 | 0.9282 | 0.9265 | 0.9266 |
| Elongation, percent | 385 | 80 | 147 | | 410 | 267 | 520 | 540 | 150 | 425 | 148 | 280 |
| Tensile Strength at Break, p.s.i. | 1,550 | 1,360 | 1,380 | 1,330 | 1,550 | 1,320 | 1,430 | 1,710 | 1,590 | 1,520 | 1,340 | 1,350 |
| Yield Strength, p.s.i. | 1,840 | 1,810 | 1,820 | 1,680 | 1,680 | 1,620 | 1,510 | 1,630 | 2,070 | 1,640 | 1,630 | 1,460 |
| Modulus, p.s.i. (Secant, 2%) | 27,300 | 27,400 | 33,300 | 24,600 | 23,900 | 24,400 | 21,600 | 23,700 | 31,300 | 31,800 | 28,300 | 25,400 |
| Torsional Stiff., p.s.i. | 44,200 | 44,400 | 59,200 | 39,900 | 35,200 | 35,000 | 30,400 | 37,600 | 60,000 | 53,200 | 46,100 | 52,500 |
| Low Temp. Brit., °C | <−76 | −71 | <−76 | −66 | <−76 | −68 | | <−76 | <−76 | <−76 | −66 | <−76 |
| Stress Crack, hrs | <0.25 | <0.25 | <0.25 | <0.25 | <0.25 | <0.25 | <0.25 | <0.25 | <0.25 | <0.25 | <0.25 | <0.25 |
| Vicat Soft. Point | 100.3 | 95.8 | 101.8 | 94.8 | 97.3 | 92.9 | 93.0 | 98.5 | 105.6 | 103.0 | 99.9 | 96.6 |
| V.T.E.S., wt., percent in Copolymer [2] | 0.00 | 0.00 | 0.00 | 1.90 | 1.70 | 3.10 | 4.31 | 0.33 | 0.46 | 0.41 | 0.50 | 2.83 |

[1] Weight percent based on weight of ethylene feed.
[2] Infrared Analysis.

TABLE II

| Polymer No | 1 | 2 | 3 | 5 | 6 | 7 | 12 |
|---|---|---|---|---|---|---|---|
| V.T.E.S. in Polymer, percent wt | 0.00 | 0.00 | 1.90 | 1.70 | 3.10 | 4.31 | 2.83 |
| Melt Index | 0.96 | 7.95 | *0.00 | 0.30 | 0.00 | *0.00 | 0.00 |
| Density | 0.9255 | 0.9231 | 0.9266 | 0.9259 | 0.9248 | 0.9229 | 0.9275 |
| Elongation, percent | 320 | 180 | 190 | 186 | 150 | 215 | 160 |
| Tensile Strength at Break, percent | 1,450 | 1,420 | 1,490 | 1,610 | 1,620 | 1,570 | 1,650 |
| Yield Strength, p.s.i. | 1,730 | 1,860 | 1,290 | 1,520 | 1,470 | 1,300 | 1,370 |
| Modulus, p.s.i. (Secant, 2%) | 24,900 | 25,900 | 18,200 | 19,300 | 17,600 | 16,500 | 20,300 |
| Torsional Stiff., p.s.i. | 43,700 | 44,600 | 28,600 | 34,600 | 23,000 | 24,600 | 23,100 |
| Low Temp. Brit., °C | <−76 | −68 | −48 | <−76 | −64 | <−76 | −66 |
| Stress Crack, hrs | <0.25 | <0.25 | >48 | >48 | >48 | >48 | 24 |
| Vicat Softening Pt., °C | 98.7 | 97 | 92.8 | 97.7 | 94.7 | 93.0 | 96.8 |

*Melt Index too low to be measured.

Example II

A number of the polymer samples produced in accordance with Example I(A) were hot worked in a roll mill under the condititions described in paragraph (B). The melt index of each of the copolymers and the straight ethylene polymers was checked at different time intervals during the milling procedure.

The resulting data are set forth in Table III and show that the melt index of the copolymer of this invention was consistently reduced to values as low as 0.00 or to a value where it is obviously negligible (Polymer No. 5).

TABLE III

| Polymer No | 1 | 2 | 5 | 7 | 3 | 12 |
|---|---|---|---|---|---|---|
| V.T.E.S. in Polymer, percent | 0.00 | 0.00 | 1.70 | 4.31 | 0.00 | 2.83 |
| Original Melt Index | 2.86 | 13.3 | 3.67 | 2.81 | 9.96 | 6.69 |
| MI at 5 min | 2.85 | 12.4 | 3.10 | 1.70 | 9.81 | 6.62 |
| MI at 30 min | 2.20 | 12.6 | 3.17 | 0.00 | 9.82 | 0.30 |
| MI at 1 hour | 2.29 | 11.9 | 2.61 | 0.00 | 9.87 | 0.00 |
| MI at 1½ hours | 0.44 | 11.4 | 1.98 | 0.00 | 9.89 | 0.00 |
| MI at 2 hours | 0.34 | 10.3 | 1.02 | 0.00 | 9.76 | 0.00 |
| MI at 2½ hours | 0.80 | 10.1 | 0.45 | 0.00 | 9.86 | 0.00 |
| MI at 3 hours | 0.96 | 7.95 | 0.30 | 0.00 | 9.93 | 0.00 |

Example III

In this series of runs a number of polymer samples produced in accordance with Example I(A) were stored at room temperature, about 70°–75° F., and the melt index checked periodically. As will be noted from the data set forth in Table IV, Polymer No. 3 containing no vinyltriethoxysilane showed only a 3% reduction in melt index after 43 days of storage. In contrast, Polymer Nos. 10 and 12, which contained 0.41 and 2.83% by weight of the vinyltriethoxysilane, showed a 56% and 64% reduction in melt index, respectively.

The above data demonstrate that the copolymerization of the admixture of ethylene and vinyltriethoxysilane, followed by mechanical working or storage of the resulting copolymeric product results in outstanding reductions in the melt index and stress crack resistance. Consequently, the novel combination of physical properties permits the copolymers of this invention to be employed for a variety of commercial applications.

While particular embodiments of this invention are shown above it will be understood that the invention is obviously subject to variations and modifications without departing from its broader aspects.

TABLE IV

| Polymer No | 3 | 10 | 12 |
|---|---|---|---|
| Melt Index at time of storage | 9.96 | 3.77 | 6.3 |
| 7 days later | 10.0 | 3.01 | 5.3 |
| 17 days later | 10.3 | 3.27 | 4.88 |
| 24 days later | 10.02 | 3.07 | 4.72 |
| 29 days later | 9.46 | 3.13 | 4.91 |
| 35 days later | 9.78 | 2.95 | 5.21 |
| 43 days later | 9.69 | 2.12 | 4.05 |
| Final MI/Original MI ×100 (percent) | 97 | 56 | 64 |

Thus, for example, conventional additives may be employed in formulating the copolymers of this invention. In addition, it is possible to prepare copolymeric products having a wide range of melt index and a stress crack resistance values, which may be varied depending on the end use.

What is claimed is:

1. A copolymer of ethylene and 0.25 to 12.5% by weight of vinyltriethoxysilane which has been mechanically worked to obtain a reduction in melt index and an increase in stress crack resistance.

2. The copolymer of claim 1 wherein said vinyltriethoxysilane is present in said copolymer in an amount of from about 1.0 to 4.0% by weight.

3. A shaped article produced by molding the ethylene-vinyltriethoxysilane copolymer of claim 1.

4. A film prepared from the ethylene-vinyltriethoxysilane copolymer of claim 1.

5. A process for producing a copolymer having a reduced melt index and an increased stress crack resistance which comprises copolymerizing ethylene and about 0.1 to 12.5% by weight of vinyltriethoxysilane at a temperature within the range of about 300° to 480° F. and a pressure of about 18,000 to 40,000 p.s.i. in the presence of a copolymerization catalyst, recovering the resulting copolymer, and mechanically working said product to obtain an ethylene-vinyltriethoxysilane copolymer having a reduced melt index and an increased stress crack resistance.

6. The process of claim 5 wherein the amount of vinyltriethoxysilane varies from about 1.0 to 4.0% by weight.

7. The process of claim 5 wherein said copolymerization catalyst is a free radical catalyst.

8. The process of claim 7 wherein said catalyst is t-butyl perpivalate.

9. The process of claim 7 wherein said catalyst is t-butyl perbenzoate.

10. The process of claim 5 wherein the resulting copolymer is mechanically worked by hot working on a roll mill.

11. The process of claim 5 wherein the working is carried out at a temperature within the range of about 250° to 450° F. for a time period ranging from about 0.1 to 2 hours.

12. A copolymer of ethylene and 0.25 to 12.25 percent by weight of vinyl triethoxysilane.

References Cited

UNITED STATES PATENTS

| 2,497,323 | 2/1950 | Roedel | 260—88.2 |
| 3,225,018 | 12/1965 | Zutty | 260—88.1 |

OTHER REFERENCES

Renfrew et al., Polyethene, Interscience Publishers, Inc. (1957), New York, p. 411. TP 986.P56. (Copy in Group 140.)

JOSEPH L. SCHOFER, *Primary Examiner.*

JAMES A. SEIDLECK, *Examiner.*

H. WONG, *Assistant Examiner.*